United States Patent
Yu et al.

(10) Patent No.: US 12,414,064 B2
(45) Date of Patent: Sep. 9, 2025

(54) DEVICE-TO-DEVICE ASSISTED TIMING SYNCHRONIZATION

(71) Applicant: NOKIA TECHNOLOGIES OY, Espoo (FI)

(72) Inventors: Ling Yu, Kauniainen (FI); Klaus Hugl, Vienna (AT); Dawid Koziol, Wroclaw (PL); Devaki Chandramouli, Plano, TX (US); Thomas Haaning Jacobsen, Nørresundby (DK)

(73) Assignee: Nokia Technologies Oy, Espoo (FI)

( * ) Notice: Subject to any disclaimer, the term of this patent is extended or adjusted under 35 U.S.C. 154(b) by 406 days.

(21) Appl. No.: 18/018,517

(22) PCT Filed: Jul. 28, 2020

(86) PCT No.: PCT/US2020/043867
§ 371 (c)(1),
(2) Date: Jan. 27, 2023

(87) PCT Pub. No.: WO2022/025868
PCT Pub. Date: Feb. 3, 2022

(65) Prior Publication Data
US 2023/0284163 A1 Sep. 7, 2023

(51) Int. Cl.
*H04W 56/00* (2009.01)
*H04W 72/25* (2023.01)

(52) U.S. Cl.
CPC ......... *H04W 56/004* (2013.01); *H04W 72/25* (2023.01)

(58) Field of Classification Search
CPC .. H04W 56/004; H04W 72/25; H04W 56/002
(Continued)

(56) References Cited

U.S. PATENT DOCUMENTS

| 11,382,083 B2 * | 7/2022 | Guo ................... H04W 88/023 |
| 11,743,966 B2 * | 8/2023 | Lee .................... H04L 27/2602 |
| | | 370/329 |

(Continued)

FOREIGN PATENT DOCUMENTS

| EP | 3761742 A1 * | 1/2021 | ........... H04B 17/336 |
| EP | 4489501 A2 * | 1/2025 | ........... H04L 47/245 |

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
(Continued)

*Primary Examiner* — Mahendra R Patel
(74) *Attorney, Agent, or Firm* — Barta Jones, PLLC

(57) ABSTRACT

Systems, methods, apparatuses, and computer program products for device-to-device (D2D) assisted 5G timing synchronization by enabling or disabling time compensation are provided. One method may include determining to initiate a procedure to determine whether to enable or disable propagation delay (PD) compensation for acquiring 5G system (5GS) timing with a sidelink (SL) group of user equipment. When it is determined to initiate the procedure,
(Continued)

the method may include transmitting propagation delay (PD) information of the user equipment as a sidelink (SL) groupcast message over a sidelink (SL) control channel to at least one of the group of user equipment, receiving at least one of acknowledgement or nonacknowledgement from one or more of the group of user equipment, and determining whether to enable or disable the propagation delay (PD) compensation based on the received acknowledgement or nonacknowledgement from the group of user equipment.

18 Claims, 9 Drawing Sheets

(58) Field of Classification Search
USPC .......................................................... 370/312
See application file for complete search history.

(56) References Cited

U.S. PATENT DOCUMENTS

| | | | | |
|---|---|---|---|---|
| 2018/0279325 | A1* | 9/2018 | Huang | H04L 5/1469 |
| 2019/0007151 | A1* | 1/2019 | Goel | H04W 56/0015 |
| 2019/0132762 | A1* | 5/2019 | Zhu | H04B 7/024 |
| 2020/0029340 | A1 | 1/2020 | He et al. | |
| 2020/0092685 | A1* | 3/2020 | Fehrenbach | H04W 36/08 |
| 2020/0120625 | A1* | 4/2020 | Park | H04W 56/001 |
| 2020/0260394 | A1* | 8/2020 | Wang | H04W 56/0015 |
| 2020/0413348 | A1* | 12/2020 | Ryu | H04W 52/241 |
| 2021/0014893 | A1* | 1/2021 | Park | H04L 5/0092 |

FOREIGN PATENT DOCUMENTS

| | | | | | |
|---|---|---|---|---|---|
| WO | WO-2020031113 | A1 | * | 2/2020 | ......... H04L 41/0893 |
| WO | 2020/064716 | A1 | | 4/2020 | |
| WO | 2020/067977 | A1 | | 4/2020 | |
| WO | WO-2020135948 | A1 | * | 7/2020 | ............. H04L 1/189 |
| WO | WO-2020198317 | A1 | * | 10/2020 | ............ H04W 72/02 |
| WO | WO-2020263064 | A1 | * | 12/2020 | .............. H04W 4/40 |
| WO | WO-2021037327 | A1 | * | 3/2021 | ......... H04B 7/18517 |
| WO | WO-2021159464 | A1 | * | 8/2021 | |

OTHER PUBLICATIONS

"IEEE Standard for Local and Metropolitan Area Networks—Timing and Synchronization for Time-Sensitive Applications", IEEE Computer Society, IEEE Std 802.1AS™, Jun. 19, 2020, 421 pages.
Extended European Search Report received for corresponding European Patent Application No. 20946585.5, dated Apr. 3, 2024, 12 pages.
"Distributed Synchronization Procedure for V2X over PC5", 3GPP TSG RAN WG1 Meeting #84bis, R1-162829, Agenda: 7.3.2.4, Ericsson, Apr. 11-15, 2016, 6 pages.
International Search Report and Written Opinion dated Oct. 21, 2020 corresponding to International Patent Application No. PCT/US2020/043867.
3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019.
SA WG2, "Revised SID: Study on enhanced support of industrial IoT," SP-200298, 3GPP TSG SA Meeting #87E, Mar. 17-20, 2020, Electronic Meeting Revision of SP-200096_rev2.
Nokia et al, "New WID on enhanced Industrial Internet of Things (IOT) and URLLC support," RP-193233, 3GPP TSG RAN Meeting #86, Sitges, Spain, Dec. 9-12, 2019.
3GPP TS 38.300 V16.1.0 (Mar. 2020), Technical Specification, 3rd Generation Partnership Project, Technical Specification Group Radio Access Network; NR; NR and NG-RAN Overall Description; Stage 2 (Release 16), Mar. 2020.
"Time Synchronization in 5G Wireless Edge: Requirements and Solutions for Critical—MTC," IEEE, published Dec. 10, 2019.

* cited by examiner

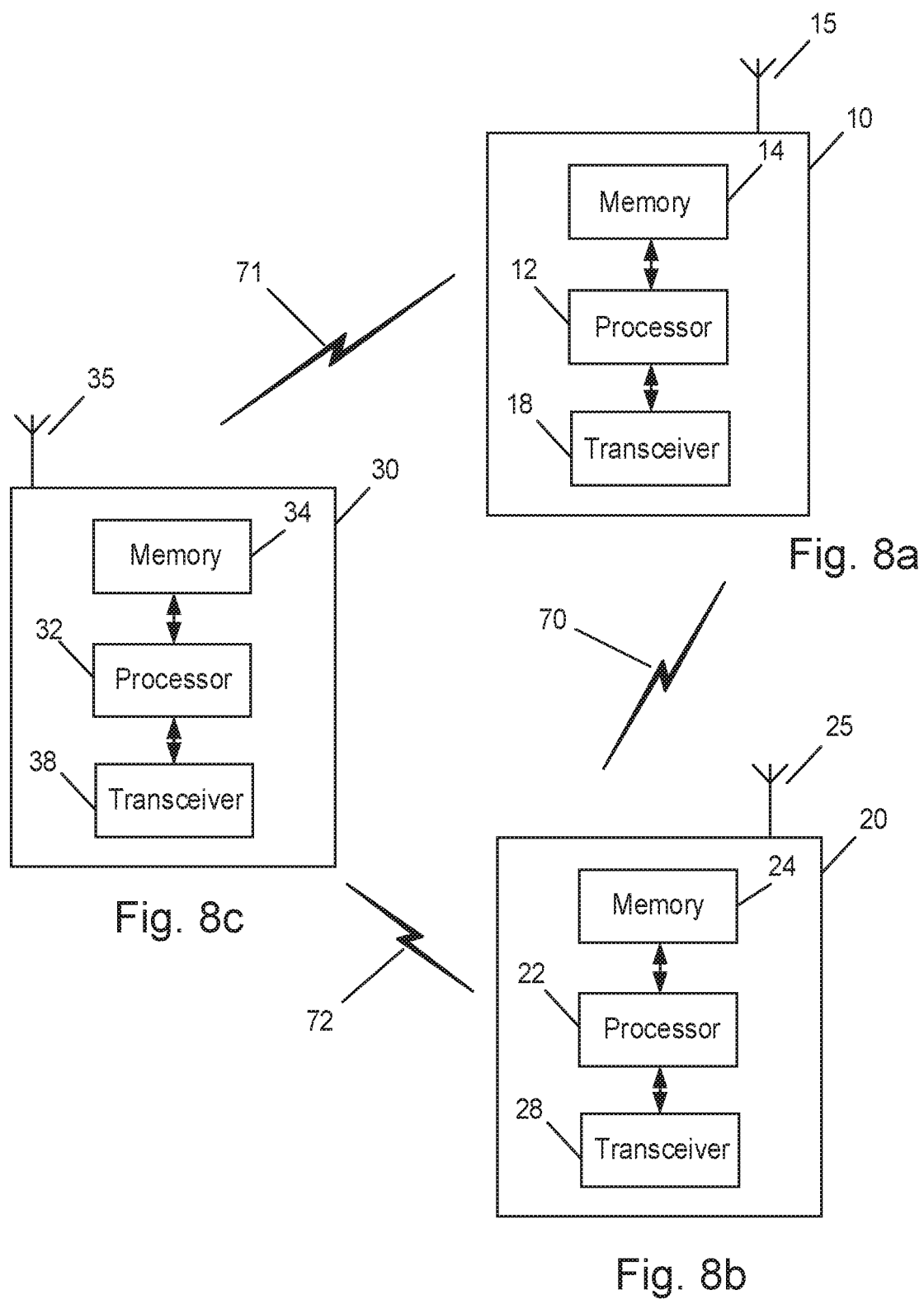

DEVICE-TO-DEVICE ASSISTED TIMING SYNCHRONIZATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to systems and/or methods for device-to-device (D2D) assisted 5G timing synchronization by enabling or disabling time compensation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An example embodiment is directed to an apparatus that may include at least one processor and at least one memory comprising computer program code. The at least one memory and computer program code configured, with the at least one processor, to cause the apparatus at least to initiate a procedure to determine whether to enable or disable propagation delay (PD) compensation for determining 5G system (5GS) timing within a sidelink (SL) group of user equipment, wherein the apparatus is configured with sidelink (SL) groupcast configuration, to transmit propagation delay (PD) information of the apparatus as a sidelink (SL) groupcast message over a sidelink (SL) control channel to at least one of the group of user equipment, to receive at least one of acknowledgement or non-acknowledgement from one or more of the group of user equipment, and to determine whether to enable or disable the propagation delay (PD) compensation based on the received acknowledgement or non-acknowledgement from the group of user equipment.

Another example embodiment is directed to a method that includes initiating, by a user equipment configured with sidelink (SL) groupcast configuration, a procedure to determine whether to enable or disable propagation delay (PD) compensation for determining 5G system (5GS) timing within a sidelink (SL) group of user equipment, transmitting propagation delay (PD) information of the user equipment as a sidelink (SL) groupcast message over a sidelink (SL) control channel to at least one of the group of user equipment, receiving at least one of acknowledgement or non-acknowledgement from one or more of the group of user equipment, and determining whether to enable or disable the propagation delay (PD) compensation based on the received acknowledgement or non-acknowledgement from the group of user equipment.

Another example embodiment is directed to an apparatus that may include means for initiating a procedure to determine whether to enable or disable propagation delay (PD) compensation for determining 5G system (5GS) timing within a sidelink (SL) group of user equipment, wherein the apparatus is configured with sidelink (SL) groupcast configuration, means for transmitting propagation delay (PD) information of the apparatus as a sidelink (SL) groupcast message over a sidelink (SL) control channel to at least one of the group of user equipment, means for receiving at least one of acknowledgement or non-acknowledgement from one or more of the group of user equipment, and means for determining whether to enable or disable the propagation delay (PD) compensation based on the received acknowledgement or non-acknowledgement from the group of user equipment.

Another example embodiment is directed to an apparatus that may include at least one processor and at least one memory comprising computer program code. The at least one memory and computer program code configured, with the at least one processor, to cause the apparatus at least to receive propagation delay (PD) information of a user equipment as a sidelink (SL) groupcast message over a sidelink (SL) control channel, wherein the apparatus is configured with sidelink (SL) groupcast configuration, to determine whether to transmit an acknowledgement or non-acknowledgement to the user equipment based on a difference between the received propagation delay (PD) information and propagation delay (PD) information of the apparatus, and to transmit at least one of the acknowledgement or non-acknowledgement to the user equipment.

Another example embodiment is directed to a method that may include receiving, at a receiving user equipment configured with sidelink (SL) groupcast configuration, propagation delay (PD) information of a transmitting user equipment as a sidelink (SL) groupcast message over a sidelink (SL) control channel, determining whether to transmit an acknowledgement or non-acknowledgement to the transmitting user equipment based on a difference between the received propagation delay (PD) information of the transmitting user equipment and propagation delay (PD) information of the receiving user equipment, and transmitting at least one of the acknowledgement or non-acknowledgement to the transmitting user equipment.

Another example embodiment is directed to an apparatus that may include means for receiving propagation delay (PD) information of a user equipment as a sidelink (SL) groupcast message over a sidelink (SL) control channel, wherein the apparatus is configured with sidelink (SL) groupcast configuration, means for determining whether to transmit an acknowledgement or non-acknowledgement to the user equipment based on a difference between the received propagation delay (PD) information and propagation delay (PD) information of the apparatus, and means for transmitting at least one of the acknowledgement or non-acknowledgement to the user equipment.

BRIEF DESCRIPTION OF THE DRAWINGS

For proper understanding of example embodiments, reference should be made to the accompanying drawings, wherein:

FIG. 8*a* illustrates an example block diagram of an apparatus, according to an example embodiment;

FIG. 8*b* illustrates an example block diagram of an apparatus, according to an example embodiment; and FIG. 8*c* illustrates an example block diagram of an apparatus, according to an example embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for device-to-device (D2D) assisted 5G timing synchronization by enabling or disabling time compensation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Figure 1:
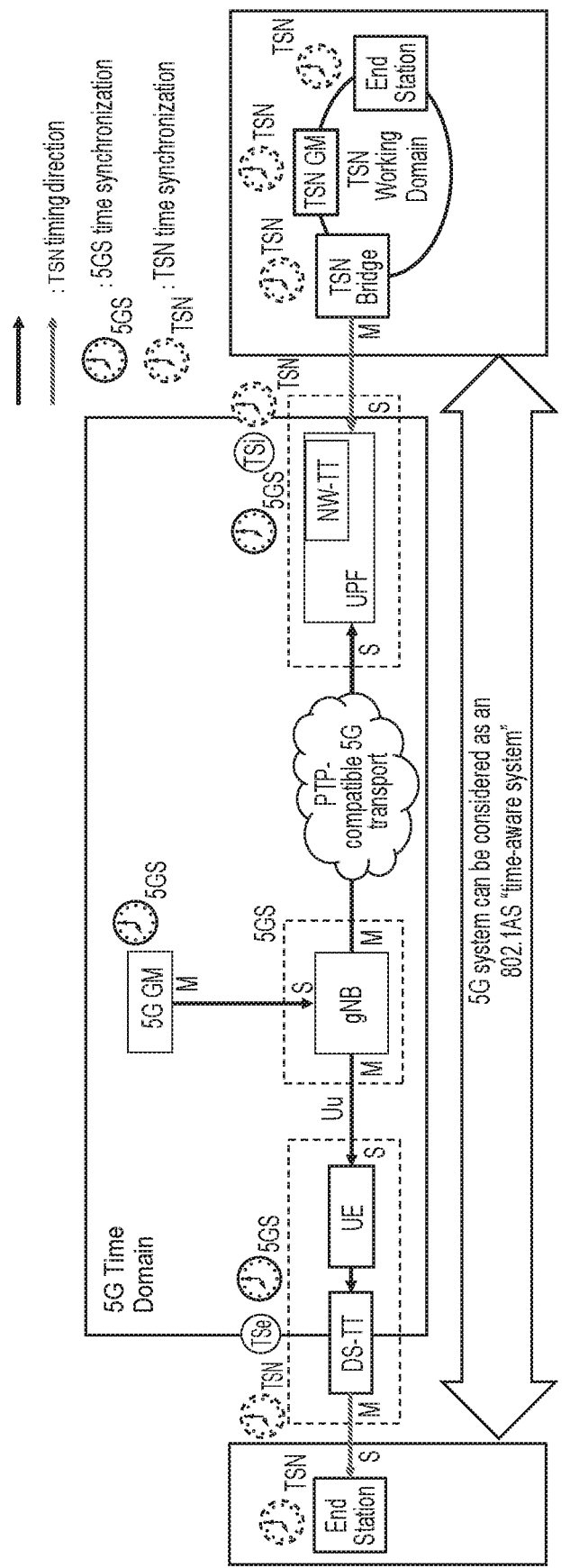
FIG. 1 illustrates an example of the 5G and TSN clock distribution model via 5G system (5GS) for time sensitive communication.

Some example embodiments may relate to enhancement of industrial internet of things (IIoT) and URLLC support, in which tight time synchronization is one of the key requirements for many industrial use cases or time sensitive communications (TSC) services that are based on, for example, time sensitive network (TSN) standard. FIG. 1 illustrates an example of the 5G and TSN clock distribution model via 5G system (5GS) for time sensitive communication. As illustrated in the example of FIG. 1, the two synchronization layers include the 5GS synchronization and the TSN domain synchronization. The 5GS synchronization is used to synchronize 5G network nodes with each other (e.g., UE, gNB, UPF), and the TSN domain synchronization is used to synchronize TSN devices with each other.

Figure 2:
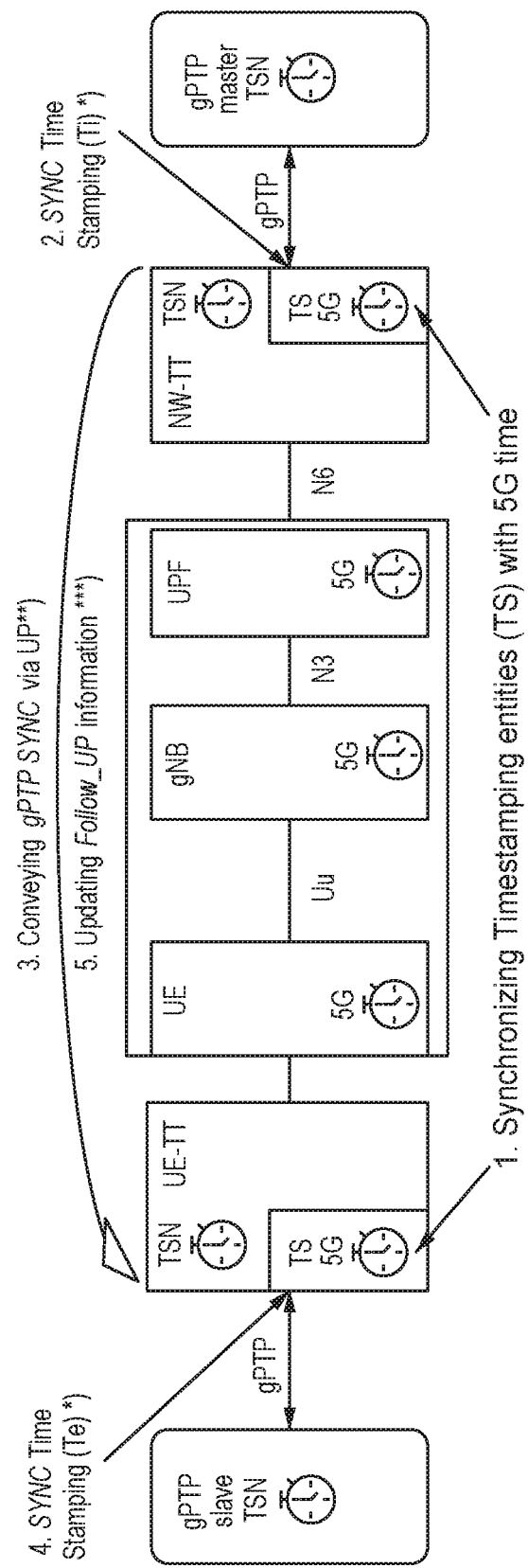
FIG. 2 illustrates an example of how the 5GS clock may be used to timestamp the gPTP messages of TSN clock domain.

The TSN clock domain may be distributed to TSN devices using generalized precision time protocol (gPTP) messages. When traversing a 5G system, which is utilized as a time-aware relay, calculation of a time that a (g)PTP message spends within 5GS may need to be done and the appropriate correction to (g)PTP message contents may be done at the egress of the 5GS. To achieve that, the (g)PTP message(s) may be timestamped with 5GS clock at the ingress and at the egress of the 5GS. FIG. 2 illustrates an example of how the 5GS clock may be used to timestamp the gPTP messages of TSN clock domain. It may be assumed that the TSN GM (working clock) is provided from the network side, i.e., the ingress is at the network-side TSN translator (NW-TT) and the egress is at the device-side TSN translator (DS-TT), as presented in FIG. 2. As illustrated in the example of FIG. 2, at 1, NW-TT and DS-TT are the synchronizing timestamping entities to perform timestamping with 5G time for gPTP messages. As also illustrated in the example of FIG. 2, at 2, synchronization timestamping in the ingress (Ti) is performed at the NW-TT and, at 3, gPTP synchronization is conveyed to the DS-TT (UE-TT) over the user plane of 5GS. At 4, synchronization timestamping in the egress (Te) is performed at the UE-TT. As further illustrated in the example of FIG. 2, at 5, follow-up information may be updated from the NW-TT to the UE-TT in case of two-step gPTP synchronization procedure.

Enhancements for supporting IIoT in 5GS include the objectives on enhanced support of integration with IEEE TSN, which may relate to support for uplink synchronization via 5GS, support for multiple working clock domains connected to the UE (considering uplink synchronization with UE as master), and support for time synchronization of UE(s) with the TSN grandmaster (GM) attached to the UE side via 5G System. Other relevant objectives may include enhancements for support of time synchronization, which may relate to the impacts on uplink time synchronization for TSN and propagation delay compensation enhancements (including mobility issues, if any).

Figure 3:
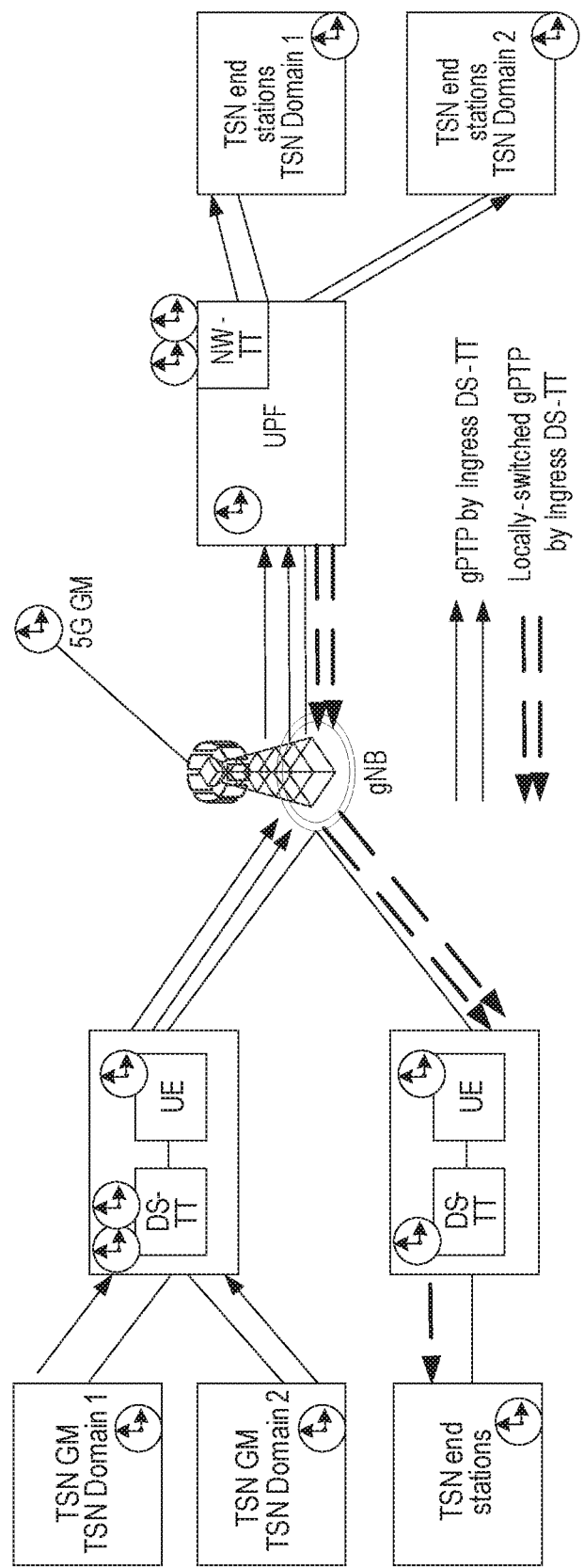
FIG. 3 illustrates an example system depicting the distribution of uplink (UL) time synchronization information.

Based on these objectives, it can be expected that support for TSN GM originating from the UE side (DS-TT) will be introduced, i.e., the ingress is on DS-TT of the UE providing TSN GM and the egress is at the DS-TT of another UE or at the UPF/NW-TT. FIG. 3 illustrates an example system depicting the distribution of uplink (UL) time synchronization information.

Figure 4:
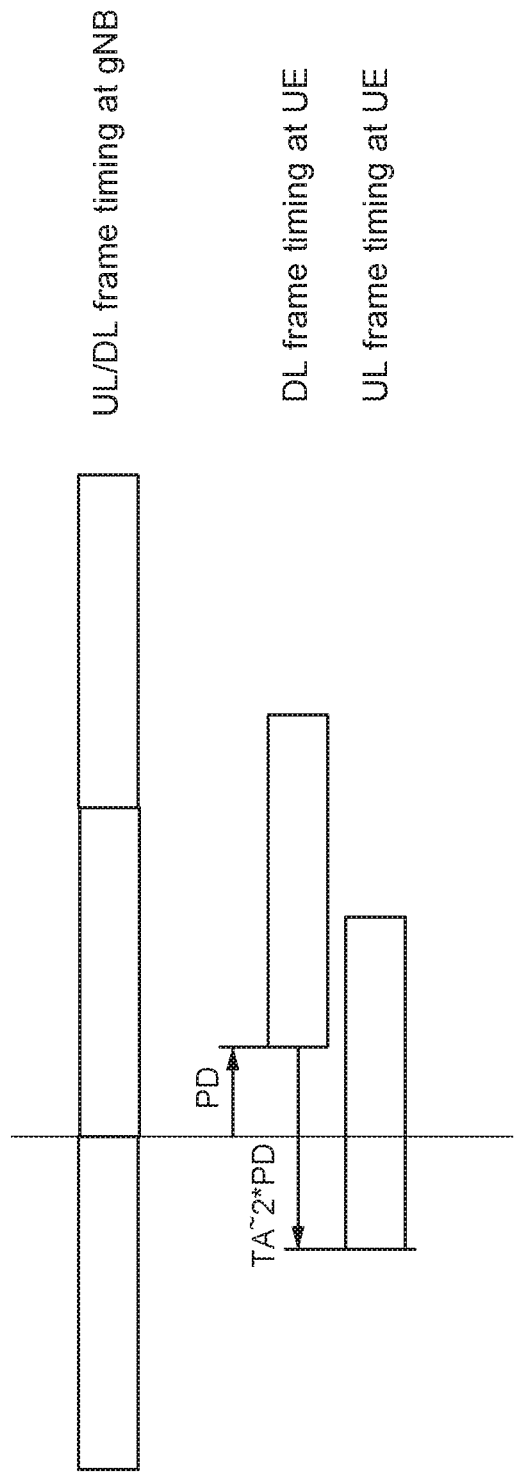
FIG. 4 illustrates an example of the UE and gNB frame misalignment due to propagation delay over the air interface.

In order to be able to calculate a gPTP message's residence time in 5GS, the ingress and the egress node of the network (DS-TT/NW-TT) should have a common understanding of the 5GS time. In a 3GPP system, 5GS time is distributed in the 5G network using, e.g., underlying (g)PTP infrastructure, and is distributed from gNBs to UEs using radio resource control (RRC) signaling (either broadcast or unicast). Underlying 5G radio frame timing at a gNB and UE is used as a common reference for the delivery of 5G clock and, when a UE receives a system information block 9 (SIB9) or RRC message, the UE associates received time information with its own reference system frame number (SFN) boundary. However, radio frame boundaries at a gNB and UE might not be perfectly aligned in time with respect to one another, i.e., the downlink frame boundary at UE is shifted by the propagation delay with respect to the corresponding frame boundary at the gNB. FIG. 4 illustrates an example of the UE and gNB frame misalignment due to propagation delay over the air interface. In order to compensate for the propagation delay (PD) of the uplink (UL) signal of the UE, the UL transmissions may be advanced with respect to the DL frame timing at the UE using timing advance (TA) commands Overall, timing advance applied by the UE to UL transmissions may be around twice a PD of the signal between the UE and the gNB.

PD compensation enhancements are expected in 3GPP Release-17. However, performing PD compensation may not always improve the accuracy of acquired time synchronization if estimation of PD is not accurate enough. For instance, one of the solutions for PD compensation is based on a UE's TA information. Due to the limitation of TA granularity, accuracy of TA estimation at the gNB and TA application at the UE, as well as TA update interval, TA-based PD compensation may introduce errors to the correction of time synchronization.

3GPP Release-17 also considers the scenario where TSN GM is attached to the UE/DS-TT side via 5G System. In this case, the ingress timestamping (TSi) and egress timestamping (TSe) for gPTP event message are both in the UE side by using 5G clock timing. If the relevant UEs are in proximity, the calculated residence time spent in 5GS and/or time stamp and rate ratio information in the gPTP message should be accurate enough if 5G timing among the relevant UEs is well synchronized even though each UE may not be fully synchronized with gNB timing due to propagation delay. This means that PD compensation may not be needed if the relevant UEs are in proximity and have the similar PD toward the gNB. In this way, the potential PD compensation error can be avoided as well. As will be discussed in more detail below, certain example embodiments may be directed to the problem of determining whether PD compensation should be enabled or disabled, leveraging also sidelink (SL), and then informing the relevant UE(s) accordingly.

Sidelink (e.g., D2D) communication has been specified in 3GPP for vehicle-to-everything (V2X) services in 5GS. However, it is also considered for usage for other use cases, such as mission critical services or public safety applications. NR sidelink communication can support one of three types of transmission modes for a pair of a source layer-2 ID and a destination layer-2 ID in the access stratum. These transmission modes include unicast transmission, groupcast transmission, and broadcast transmission. Unicast transmission is characterized by the support of PC5-RRC connection between peer UEs for the pair, the transmission and reception of control information and user traffic between peer UEs in sidelink, the support of sidelink hybrid automatic repeat request (HARQ) feedback, the support of radio link control (RLC) acknowledgement mode (AM), and the detection of radio link failure for the PC5-RRC connection. Groupcast transmission is characterized by the transmission and reception of user traffic among UEs belonging to a group in sidelink, and the support of sidelink HARQ feedback. Broadcast transmission is characterized by the transmission and reception of user traffic among UEs in sidelink.

In order to support NR sidelink (SL) communication, a physical sidelink control channel (PSCCH), a physical sidelink shared channel (PSSCH), and a physical sidelink feedback channel (PSFCH) are introduced. The physical sidelink control channel (PSCCH) indicates resource and other transmission parameters used by a UE for PSSCH. The physical sidelink shared channel (PSSCH) transmits the transport blocks (TBs) of data themselves, and control information for HARQ procedures and channel state information (CSI) feedback triggers, etc. The physical sidelink feedback channel (PSFCH) carries HARQ feedback over the sidelink from a UE which is an intended recipient of a PSSCH transmission to the UE which performed the transmission.

SL HARQ feedback can be operated in one of two options. In one option, either acknowledgement (ACK) or negative acknowledgement (NACK) is transmitted over PSFCH using a resource dedicated to a single PSFCH transmitting UE. In another option, only NACK is transmitted over PSFCH using the common PSFCH resources among PSFCH transmitting UEs of the same SL groupcast communication.

According to an example embodiment, the existing SL groupcast transmission may be reused for informing PD among the relevant UEs. However, rather than using PSSCH for transmission of PD information, an example embodiment is configured to use PSCCH and corresponding PSFCH to exchange PD information and provide feedback on the difference of PDs among the relevant UEs in order to enable or disable PD compensation in a more efficient and faster way.

Figure 5:
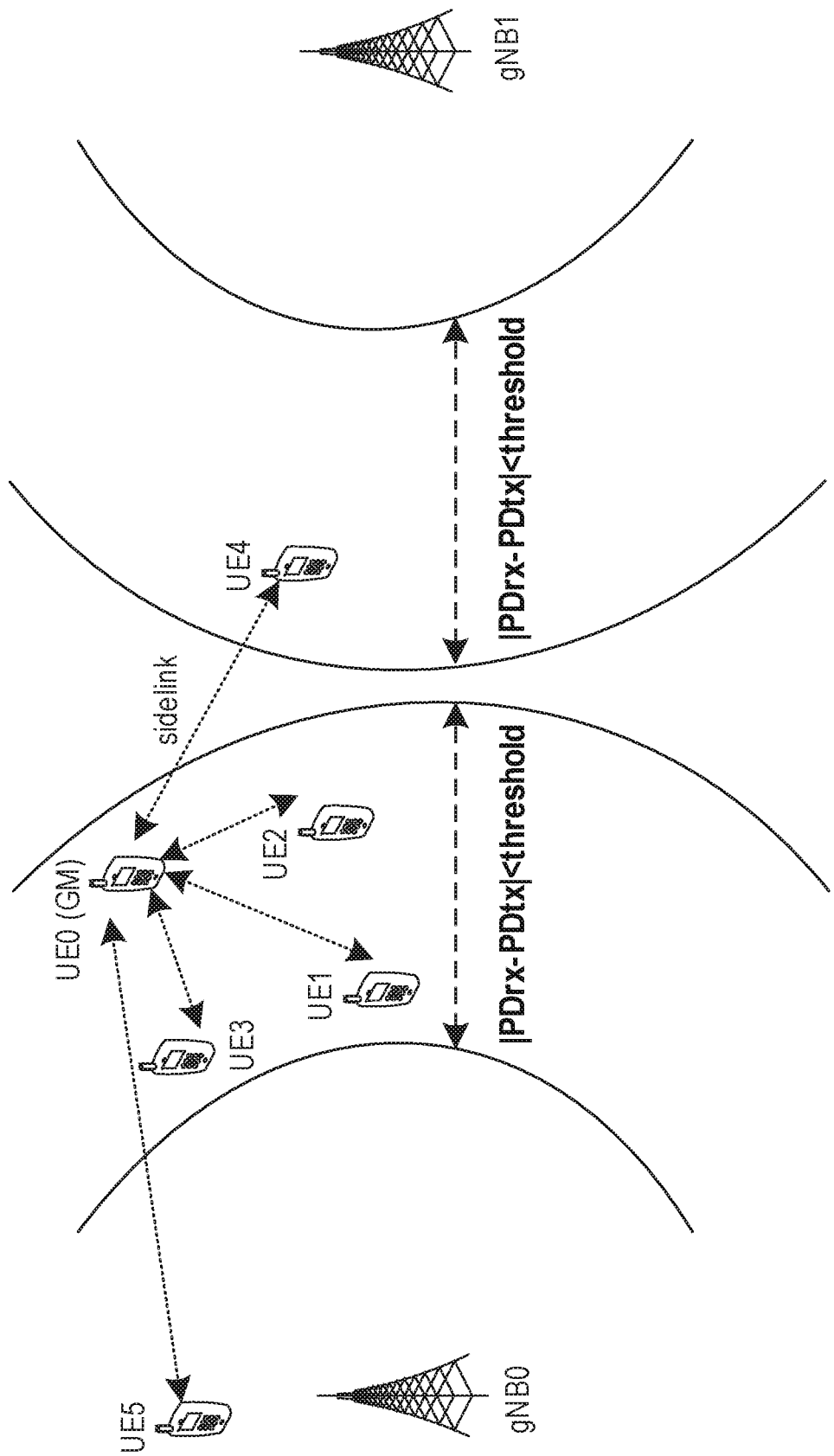
FIG. 5 illustrates an example of a system, according to an example embodiment.

An example embodiment may relate to the scenario in which TSN GM is attached to the UE/DS-TT side while the gPTP event messages are still transmitted via 5GS from TSN GM UE/DS-TT to other relevant UEs/DS-TTs using the 5G timing for timestamping. FIG. 5 illustrates an example of a system, according to an example embodiment. If a certain similarity in PD amongst the relevant UEs can be guaranteed, the best accuracy of 5G timing synchronization among the UEs in proximity can be achieved when PD compensation is not used.

Some example embodiments provide SL assisted mechanism of determining the necessity of PD compensation for acquiring 5G timing synchronization within a group of relevant UEs. According to an example embodiment, a UE, such as UE0 in the example of FIG. 5, may be configured with TSN timing synchronization relevant SL groupcast configuration, such as SL groupcast destination layer 2 (L2) identifier (ID), group size, member ID of each of the UEs in the configured SL groupcast, etc. The UE0 may also be configured as transmitting (Tx) UE of SL groupcast to initiate the following procedure for determining whether to enable or disable PD compensation for acquiring 5GS timing within the group of UEs. In an example embodiment, UE0 may determine whether to initiate the following procedure based on whether there is a remote UE out of the SL groupcast range according to the information or configuration provided from, e.g., application layer or based on the knowledge learned from other SL communication services (e.g., RLF detected on SL unicast link between UE0 and one of the group member UEs if they happen to have SL unicast link established).

In one example embodiment, UE0 may initiate the procedure by sending its PD information of Uu interface (PDtx)

using SL groupcast control channel (PSCCH). According to an example, a new sidelink control information (SCI) format type of PSCCH may be defined for exchange of PD information of UE0. In the new SCI format, in addition to the PD information, the whole destination L2 ID of SL groupcast communication may be included. In the new SCI format, UE0 may also indicate the reserved resources for next message transmission on PSCCH, as discussed below.

Other UE(s) (which may be denoted as SL receiving (Rx) UE elsewhere herein), upon receiving PSCCH from UE0 with the information about PD of UE0, may respond with the ACK or NACK in SL feedback channel (PSFCH) according to the following criteria. For example, the criteria may include that ACK is provided if IPDrx-PDtxl<PDthreshold, where PDrx is PD over Uu interface experienced by SL Rx UE, PDthreshold is a configured threshold on the PD difference between UE0 and Rx UE. The PDthreshold may be configured to SL Rx UEs either from 5GS using, e.g., dedicated RRC signalling or broadcasted signaling (e.g., system information) or from UE0 via SL. In the latter case, PDthreshold may be also indicated in the new SCI format together with PDtx information. Otherwise, NACK may be provided.

In an example embodiment, UE0 may determine whether to enable or disable PD compensation based on received ACKs/NACKs from the UE members, e.g., UE1, UE2, UE3, UE4 or UE5 in the example of FIG. 5. For instance, according to one example embodiment, when ACKs are received from all UE members, then PD compensation may be disabled. Otherwise, when ACKs are not received from all UE members, then PD compensation may be enabled.

According to an example embodiment, UE0 may send a second SL groupcast message over PSCCH depending on the decision of whether to enable or disable PD compensation. In some example embodiments, at least two options may be used for the second message to inform of the decision of enabling or disabling PD compensation from UE0 to SL Rx UEs (e.g., UE1-UE5).

According to a first option, UE0 may send the second SL control message in reserved resource when a decision to enable PD compensation is made. In this option, SL Rx UEs may disable PD compensation if no second SL message in the reserved resources is received.

According to a second option, UE0 may send the second SL control message in reserved resource to inform SL Rx UEs (especially ACK UEs) whether PD compensation is disabled or enabled. In this option, SL Rx UE may inform UE0 using PSFCH whether the second SL control message in the reserved resources has been received. This can trigger the restart of the procedure from UE0 faster if any SL Rx UE informs that the second SL control message has not been received.

In both options, all NACKed SL Rx UEs may also help to send the "enable PD compensation" control message in the reserved SL resources. Also, in both options, another new SCI may be defined as the SL control message to inform of the decision to enable PD compensation in the first option and/or inform of the decision to enable or disable PD compensation in the second option.

For the procedures described above, the involved UE(s) may estimate the PD without being restricted to such a method, e.g., based on the timing advance as used for the discussed propagation delay compensation. This may include UE0 when determining PDtx to be signaled to the group of UEs as well as the other UEs in the group in their procedure to determine PDrx.

Figure 6:
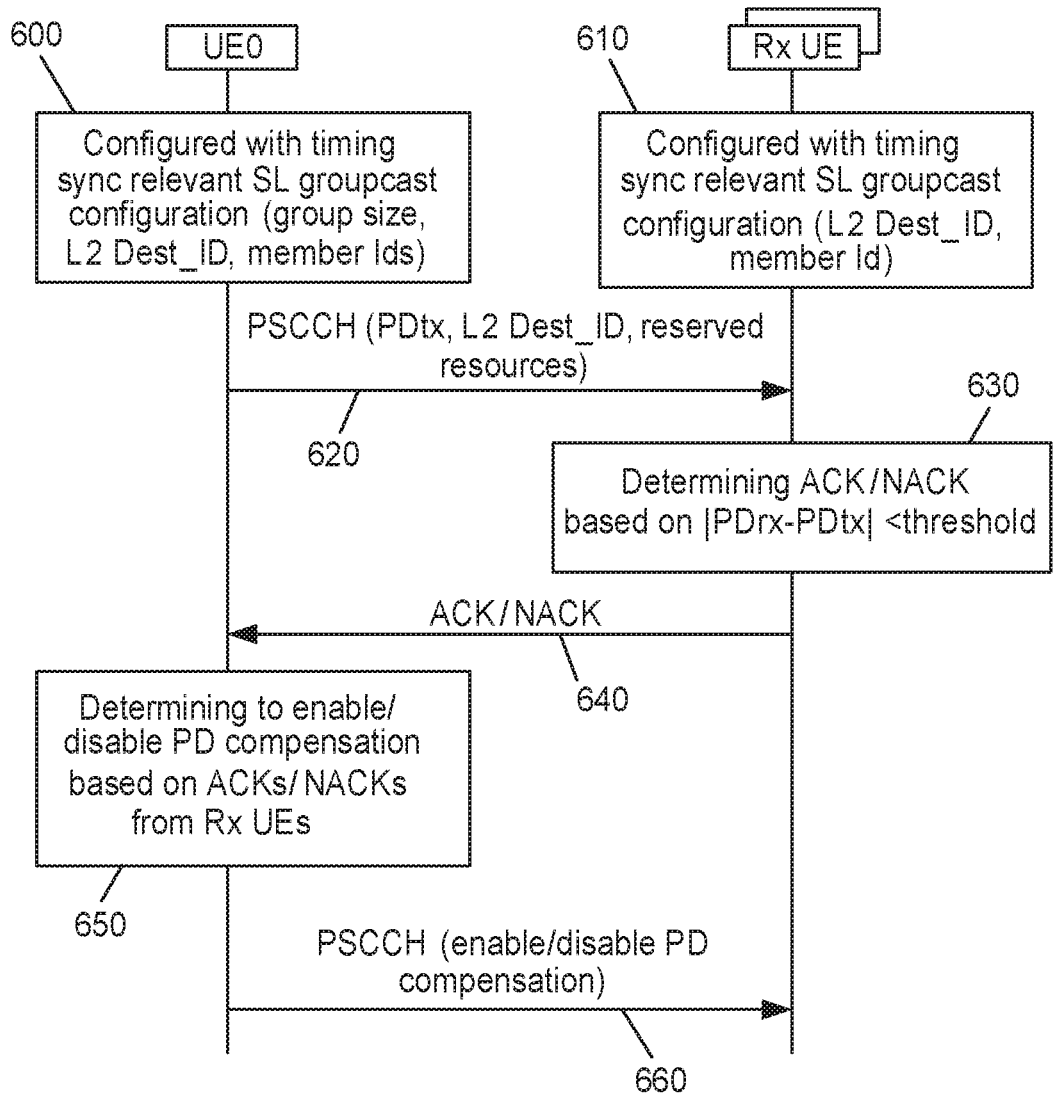
FIG. 6 illustrates an example signaling diagram, according to one example embodiment.

FIG. 6 illustrates an example signaling diagram, according to one example embodiment. As illustrated in the example of FIG. 6, at 600, at least one of the relevant UEs related to, e.g., TSN timing synchronization is configured as SL groupcast Tx UE (i.e., UE0 in the example of FIG. 6). In the example of FIG. 6, the UE that is attached with TSN GM may be configured as UE0. However, any other UE in the group of relevant UEs may be also configured as UE0. In these two cases, the PDthreshold may be configured either the same or differently depending on whether the UE with TSN GM or other UEs in the group is configured as UE0. UE0 may be configured with TSN timing synchronization related SL groupcast configuration, which may include at least one of the SL L2 destination ID of the groupcast, group size, and/or the member IDs of each group member in the SL groupcast, etc. In addition, at 610, the other UE(s) in the group (e.g., one or more Rx UE(s) in the example of FIG. 6) may also be configured with the corresponding SL groupcast configuration that includes at least the same SL L2 destination ID and/or the UE's member ID. The configuration may be provided to UE0 and other UE(s) via application layer (e.g., TSN related application or ProSe/SL related application) or through 5GS network. If one UE is involved in multiple TSN domains, the UE may be configured with multiple SL groupcast configurations for timing synchronization in different TSN domains.

In certain example embodiments, upon obtaining the SL groupcast configuration, UE0 may initiate the provided procedure for the determination of disabling or enabling PD compensation on acquiring 5G timing. According to some example embodiments, the initiation may be triggered periodically (e.g. the timer based initiation) and/or event triggered after first initiation (e.g., if the change of its own PDtx exceeds the certain configured threshold).

As illustrated in the example of FIG. 6, when the procedure is initiated, at 620, UE0 may transmit its own PD information as SL groupcast message over SL control channel (PSCCH) to one or more Rx UE(s). The SL control channel (PSCCH) is a standalone SL control channel without associated SL data channel (PSSCH) transmission. In order to allow SL Rx UEs to identify the destination L2 ID of SL groupcast, the whole L2 destination ID of the groupcast may be included in PSCCH. In addition, if resource allocation information is also included in the transmitted message over SL control channel, the resource allocation does not correspond to the associated PSSCH, but to the next SL groupcast message that UE0 will transmit after the first message of PD information. The number of bits for PD information in the new SCI format may be defined based on the required granularity of PD information for robust timing synchronization. For instance, as one example, 12 bits of PD information field in the new SCI format may be defined to achieve similar timing granularity as timing advance for UL transmission.

Upon receiving PD information transmitted over PSCCH from UE0, SL Rx UEs in the group check the difference of its own PD (PDrx) with UE0's PD (PDtx). As illustrated in the example of FIG. 6, at 630, SL Rx UE(s) may determine ACK/NACK based on whether IPDtx-PDrxl<PDthreshold. For example, if IPDtx-PDrxl<PDthreshold, then RX UE may transmit, at 640, ACK over SL feedback channel (PSFCH) of the SL groupcast. Otherwise, at 640, Rx UE may transmit NACK. Herein, the existing PSFCH features on identifying and determining each Rx UE's feedback resources for HARQ feedback can be reused. However, it is noted that the determination of ACK/NACK provided herein is not for HARQ feedback of SL data transmission. Instead, according to example embodiments, the determination of ACK/NACK may be used to inform UE0 whether Rx UE's PD is within a certain similarity of UE0's PD.

Based on the feedback from Rx UEs' ACKs/NACKs, at 650, UE0 may determine whether to disable or enable PD compensation within the group of UEs and inform the Rx UEs for the decision. At 660, UE0 may transmit an enable or optional disable PD compensation message over PSCCH. As PD compensation can be disabled when all Rx UEs provide ACK feedbacks, UE0 may not be required to send "disable PD compensation" command as the second groupcast message. In this case, in an example embodiment, if Rx UEs do not receive a second groupcast message in the reserved resources indicated and transmitted in the first groupcast message, UE0 and Rx UEs may start using 5G timing acquired from gNB without PD compensation for timestamping gPTP messages after n TTIs of the reserved resources for the second groupcast message. Herein, "n($>=0$)" may be configured to the UEs commonly in SL groupcast configuration described above. However, this option may not be fully robust if there is communication error in the second groupcast message transmission of "enabling PD compensation". If some of the Rx UEs do not receive an "enabling PD compensation" in the second groupcast message, this may trigger the Rx UEs to disable PD compensation wrongly. To avoid such error case, another option is proposed that UE0 may send either "disable PD compensation" or "enable PD compensation" as the second groupcast message. If a Rx UE does not receive the second groupcast message, then that Rx UE sends NACK over PSFCH to UE0 for triggering re-initiation of the procedure earlier. In either option, as NACKed Rx UEs of the first groupcast message know for sure UE0 will send "enable PD compensation" in the second groupcast message, NACKed Rx UEs may also assist UE0 to transmit "enable PD compensation" command in reserved resources for the second groupcast message to increase the reliability of reception of the second groupcast message by ACKed Rx UEs. In some example embodiments, the first option may be applied in the scenario of reliable SL communication, while the second option may be applied if high reliability of SL communication cannot be guaranteed.

Depending on the implementation for the interface between UE and DS-TT, the UE(s) in the group may also indicate the decision of enabling or disabling PD compensation to the DS-TT(s) behind the respective UE(s) as the DS-TT(s) are eventually responsible for generating the gPTP message and/or inserting the time stamp within the gPTP message. This may be needed if UE provides to DS-TT the uncompensated 5G timing and PD separately so that DS-TT will use the PD compensation enabling or disabling outcome to derive the correct timing for timestamping the gPTP message.

Figure 7A:
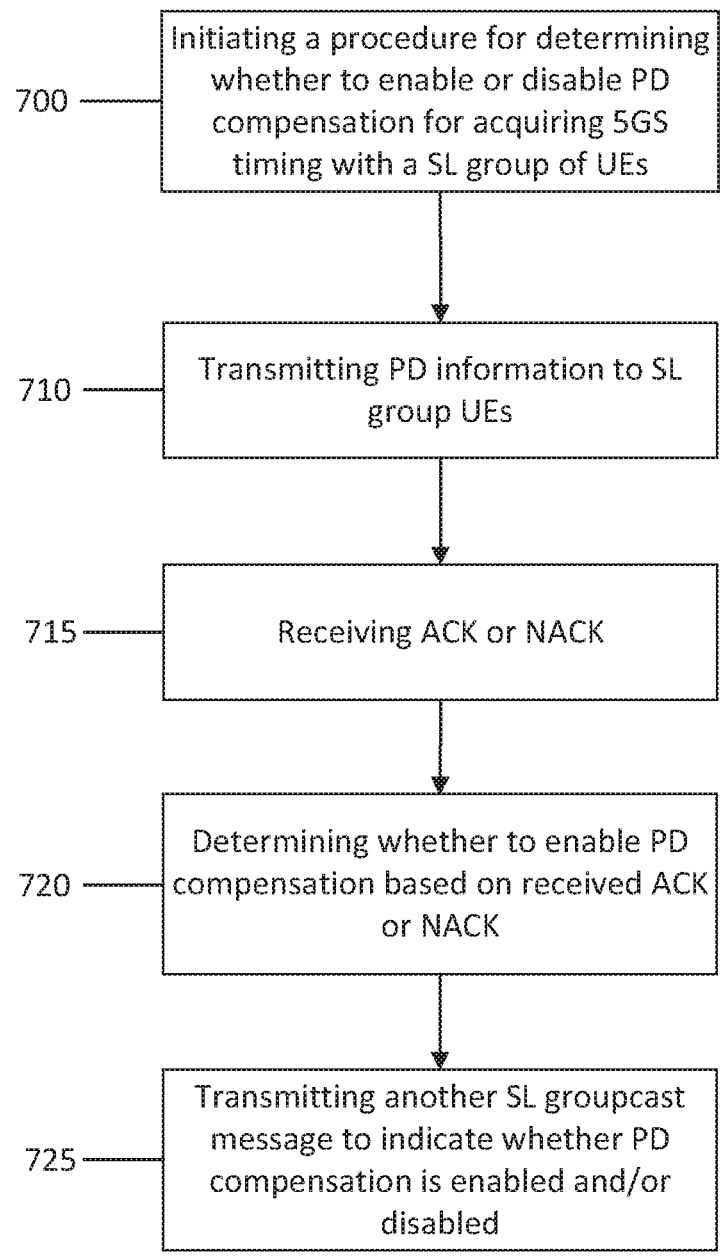
FIG. 7*a* illustrates an example flow diagram of a method, according to one example embodiment.

FIG. 7a illustrates an example flow diagram of a method for determining PD compensation for acquiring 5G timing synchronization within a group of UEs, according to one example embodiment. In certain example embodiments, the flow diagram of FIG. 7a may be performed by a network entity or network node in a communications system, such as LTE or 5G NR. In some example embodiments, the network entity performing the method of FIG. 7a may include a UE, such as a SL UE (e.g., SL Tx UE or SL Rx UE), mobile station, IoT device, or the like. For instance, in one example embodiment, the method of FIG. 7a may be performed by a UE configured as a Tx UE of a SL group, such as UE0 depicted in the example signaling diagram of FIG. 6.

In an example embodiment, as illustrated in the example of FIG. 7a, a method may include, at 700, initiating a procedure for determining whether to enable or disable PD compensation for acquiring 5GS timing with a SL group of UEs. According to certain example embodiments, the UE performing the method of FIG. 7a may be configured with SL groupcast configuration. In some examples, the SL groupcast configuration may include SL groupcast destination L2 ID, group size of the SL group of UEs, member ID of each of the UEs in the SL group, etc. In some example embodiments, the initiating 700 may include determining whether to initiate the procedure based on whether there is a remote UE outside of the SL groupcast range according to information or configuration provided from, for example, the application layer or based on the knowledge learned from other SL communication services (e.g., radio link failure detected on SL unicast link between the Tx UE and one of the UEs of the SL group if they happen to have SL unicast link established).

When determining PD compensation procedure is initiated at 700, then the method may include, at 710, transmitting PD information of the Tx UE to the SL group UEs using SL groupcast control channel (e.g., PSCCH). In an example embodiment, the transmitting 710 may include transmitting the PD information using a new SCI format type that includes the PD information, the entire destination L2 ID of SL groupcast communication, and/or an indication of reserved resources for a possible next SL groupcast message transmission on the SL groupcast control channel (e.g., PSCCH).

According to certain example embodiments, the method of FIG. 7a may include, at 715, receiving an acknowledgement and/or non-acknowledgement from one or more of the UEs of the SL group. In an example embodiment, the method may then include, at 720, determining whether to enable or disable the PD compensation based on the received acknowledgement and/or non-acknowledgement from the UEs of the SL group. In one example embodiment, the determining 720 may include determining to disable the PD compensation when acknowledgement is received from all of the UEs in the SL group. According to an example embodiment, the determining 720 may include determining to enable the PD compensation when acknowledgement is not received from all of the UEs in the SL group.

In certain example embodiments, the method of FIG. 7a may include, at 725, transmitting another SL groupcast message over the SL control channel to inform the UEs of the SL group the decision of whether to enable or disable the PD compensation. According to an example embodiment, the transmitting 725 may include transmitting a second SL control message in one or more reserved resources when it is determined to enable the PD compensation.

In further example embodiments, the transmitting 725 may include transmitting a second SL control message in one or more reserved resources to inform the UEs of the SL group of whether PD compensation is enabled or disabled. In this case, in an example embodiment, the method may include receiving, from one or more of the UEs of the SL group, an indication of whether the second SL control message in the one or more reserved resources has been received. In certain example embodiments, the second SL control message may include SCI to indicate that the PD compensation is enabled or to indicate whether the PD compensation is enabled or disabled.

Figure 7B:
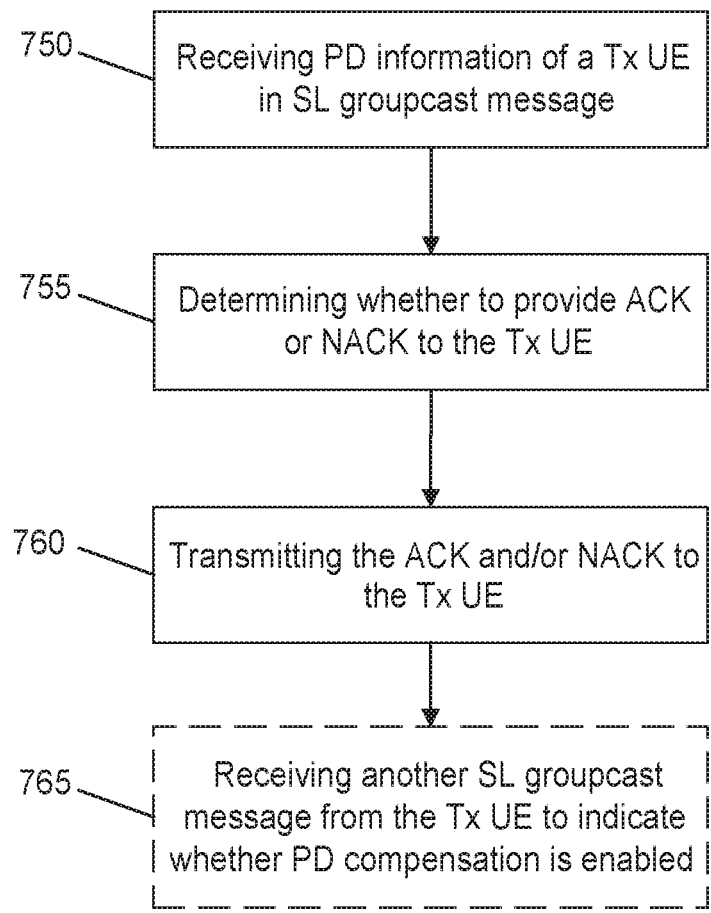
FIG. 7*b* illustrates an example flow diagram of a method, according to one example embodiment.

FIG. 7b illustrates an example flow diagram of a method for determining PD compensation for acquiring 5G timing synchronization within a group of UEs, according to one example embodiment. In certain example embodiments, the flow diagram of FIG. 7b may be performed by a network entity or network node in a communications system, such as LTE or 5G NR. In some example embodiments, the network entity performing the method of FIG. 7b may include a UE, such as a SL UE (e.g., SL Tx UE or SL Rx UE), mobile station, IoT device, or the like. For instance, in one example embodiment, the method of FIG. 7b may be performed by a UE configured as a Rx UE of a SL group, such as Rx UE(s) depicted in the example signaling diagram of FIG. 6. According to certain example embodiments, the UE performing the method of FIG. 7b may be configured with SL groupcast configuration. In some examples, the SL groupcast configuration may include at least one of SL groupcast destination L2 ID, group size of the SL group of UEs, member ID of each of the UEs in the SL group and the member ID of the Rx UE, etc.

In an example embodiment, as illustrated in the example of FIG. 7b, a method may include, at 750, receiving PD information of a Tx UE in a SL groupcast message over a SL control channel (e.g., PSCCH). According to one example embodiment, the receiving 750 of the PD information may include receiving the PD information in SC', and the SCI may further include an entire destination L2 ID of SL groupcast communication and/or an indication of the reserved resources for a possible second message transmission on the sidelink (SL) control channel.

As further illustrated in the example of FIG. 7b, the method may include, at 755, determining whether to transmit an acknowledgement or non-acknowledgement to the Tx UE based on a difference between the received PD information of the Tx UE and the PD information of the receiving UE. In an example embodiment, based on the determination of whether to transmit the acknowledgement or non-acknowledgement, the method may include, at 760, transmitting at least one of the acknowledgement or non-acknowledgement to the Tx UE.

For instance, in one example embodiment, when the difference between the received PD information of the Tx UE and the PD information of the Rx UE is less than and/or equal to a PD threshold, the transmitting 760 may include transmitting the acknowledgement to the Tx UE over a SL feedback channel. In other words, as an example, acknowledgement may be transmitted if IPDrx-PDtxl<PDthreshold, where PDrx is PD over Uu interface experienced by the Rx UE, PDtx is PD experienced by the Tx UE, and the PDthreshold is a configured threshold on the PD difference between the Tx UE and Rx UE. In an example embodiment, PDthreshold may be configured to the Rx UE from 5GS using, e.g., dedicated RRC signalling or broadcast signalling (e.g., system information) or from the Tx UE via SL. In the case where the PDthreshold is provided from the Tx UE, the PDthreshold may be indicated in the new SCI format together with the PD information of the Tx UE. According to certain example embodiments, when the difference between the received PD information of the Tx UE and the PD information of the Rx UE is not less than and/or equal to a PD threshold, the transmitting 760 may include transmitting the non-acknowledgement to the Tx UE over a SL feedback channel.

In some example embodiments, the method of FIG. 7b may optionally include, at 765, receiving another SL groupcast message over the SL control channel to indicate whether PD compensation is enabled or disabled. According to an example embodiment, the receiving 765 of the another sidelink (SL) groupcast message may include receiving, from the Tx UE, a second SL control message in one or more reserved resources to indicate the PD compensation is enabled. In certain example embodiments, the second SL control message may include SCI to indicate that the PD compensation is enabled or to indicate whether the PD compensation is enabled or disabled. According to some example embodiments, the method may include transmitting, to the Tx UE, an indication of whether a second SL control message in the one or more reserved resources has been received.

According to certain example embodiments, when a second SL control message is not received, the method may include starting to use 5G timing as acquired from the network (e.g., gNB) without PD compensation after a configured number (n) of transmission time intervals (TTIs) of the reserved resources for the second SL control message. Further, in some example embodiments, when a second SL control message is not received, the method may include transmitting a non-acknowledgement over the SL feedback channel to trigger re-initiation of the procedure for determining whether to enable or disable the PD compensation.

FIG. 8a illustrates an example of an apparatus 10 according to an example embodiment. In an example embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be standalone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. In certain example embodiments, transceiver 18 may be configured as a transceiving means for transmitting or receiving information as discussed elsewhere herein.

Additionally or alternatively, in some example embodiments, apparatus 10 may include an input and/or output device (I/O device) or means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node or RAN node, such as a base station, access point, Node B, eNB, gNB, WLAN access point, or the like. For example, in some example embodiments, apparatus 10 may be configured to perform one or more of the processes depicted in any of the flow charts or signaling diagrams described herein. In some example embodiments, as discussed herein, apparatus 10 may be configured to perform a procedure relating to 5G timing synchronization, for instance.

According to certain example embodiments, apparatus 10 may be controlled by memory 14 and processor 12 to configure one or more UEs of a SL group with SL groupcast configuration, which may include one or more of the SL L2 destination ID of the groupcast, the SL group size, the member IDs of the SL group member(s) in the SL groupcast, etc. In an example embodiment, if one UE is involved in multiple TSN domains, apparatus 10 may be controlled by memory 14 and processor 12 to configure the UE with multiple SL groupcast configurations for timing synchronization in different TSN domains. According to some example embodiments, apparatus 10 may be controlled by memory 14 and processor 12 to provide or transmit 5G timing to one or more UEs of the SL group.

FIG. 8b illustrates an example of an apparatus 20 according to another example embodiment. In an example embodiment, apparatus 20 may be a node or element in a communications network or associated with such a network, such as a UE, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 20 may include an input and/or output device (I/O device). In certain example embodiments, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some example embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some example embodiments, apparatus 20 may be a UE (e.g., SL UE), TSN device, mobile device, mobile station, ME, IoT device and/or NB-IoT device, for example. According to certain example embodiments, apparatus 20 may be controlled by memory 24 and processor 22 to perform the functions associated with example embodiments described herein. For example, in some example embodiments, apparatus 20 may be configured to perform one or more of the processes depicted in any of the flow charts or signaling diagrams described herein, such as those illustrated in FIG. 6, 7a or 7b. In certain example embodiments, apparatus 20 may include or represent a UE, such as a SL UE. In one example embodiment, apparatus 20 may represent a SL Tx UE, such as UE0 illustrated in the example of FIG. 6. According to an example embodiment, apparatus 20 may be configured to perform a procedure relating to improving 5G timing synchronization, for instance.

In certain example embodiments, apparatus 20 may be controlled by memory 24 and processor 22 to initiate a procedure to determine whether to enable or disable PD compensation for acquiring 5GS timing within a SL group of UEs. According to certain example embodiments, apparatus 20 may be configured with SL groupcast configuration. In some examples, the SL groupcast configuration may include SL groupcast destination L2 ID, group size of the SL group of UEs, member ID of each of the UEs in the SL group, etc. In some example embodiments, apparatus 20 may be controlled by memory 24 and processor 22 to determine whether to initiate the procedure based on whether there is a remote UE outside of the SL groupcast range according to information or configuration provided from, for example, the application layer or based on the knowledge learned from other SL communication services (e.g., radio link failure detected on SL unicast link between the Tx UE and one of the UEs of the SL group if they happen to have SL unicast link established).

In some example embodiments, when the procedure is initiated, then apparatus 20 may be controlled by memory 24 and processor 22 to transmit its PD information to the SL group UEs using a SL groupcast control channel (e.g., PSCCH). In an example embodiment, apparatus 20 may be controlled by memory 24 and processor 22 to transmit the PD information using a new SCI format type that may include the PD information, the entire destination L2 ID of SL groupcast communication, and/or an indication of reserved resources for a possible next SL groupcast message transmission on the SL groupcast control channel (e.g., PSCCH).

According to certain example embodiments, apparatus 20 may be controlled by memory 24 and processor 22 to receive an acknowledgement and/or non-acknowledgement from one or more of the UEs of the SL group. In an example embodiment, apparatus 20 may be controlled by memory 24 and processor 22 to determine whether to enable or disable the PD compensation based on the received acknowledgement and/or non-acknowledgement from the UEs of the SL group. In one example embodiment, apparatus 20 may be controlled by memory 24 and processor 22 to determine to disable the PD compensation when acknowledgement is received from all of the UEs in the SL group. According to an example embodiment, apparatus 20 may be controlled by memory 24 and processor 22 to determine to enable the PD compensation when acknowledgement is not received from all of the UEs in the SL group.

In certain example embodiments, apparatus 20 may be controlled by memory 24 and processor 22 to transmit another SL groupcast message over the SL control channel to inform the UEs of the SL group of the decision of whether to enable or disable the PD compensation. According to an example embodiment, apparatus 20 may be controlled by memory 24 and processor 22 to transmit a second SL control message in one or more reserved resources when it is determined to enable the PD compensation. In further example embodiments, apparatus 20 may be controlled by memory 24 and processor 22 to transmit a second SL control message in one or more reserved resources to inform the UEs of the SL group of whether PD compensation is enabled or disabled. In this case, in an example embodiment, apparatus 20 may be controlled by memory 24 and processor 22 to receive, from one or more of the UEs of the SL group, an indication of whether the second SL control message in the one or more reserved resources has been received by the UE(s) of the SL group. In certain example embodiments, the second SL control message may include SCI to indicate that the PD compensation is enabled or to indicate whether the PD compensation is enabled or disabled.

FIG. 8c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 8c.

As illustrated in the example of FIG. 8c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 8c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE (e.g., SL UE), mobile device, mobile station, ME, IoT device, TSN device and/or NB-IoT device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent a UE, such as one or more of the Rx UE(s) illustrated in the example of FIG. 6. According to certain example embodiments, apparatus 30 may be configured to perform a procedure relating to 5G timing synchronization, for instance.

According to an example embodiment, apparatus 30 may be configured with SL groupcast configuration. In some examples, the SL groupcast configuration may include at least one of SL groupcast destination L2 ID, group size of the SL group of UEs, member ID of each of the UEs in the SL group, and the member ID of the apparatus 30, etc.

In some example embodiments, apparatus 30 may be controlled by memory 34 and processor 32 to receive PD information of a Tx UE in a SL groupcast message over a SL control channel (e.g., PSCCH). According to one example embodiment, apparatus 30 may be controlled by memory 34 and processor 32 to receive the PD information in SCI, and the SCI may further include an entire destination L2 ID of SL groupcast communication or an indication of the reserved resources for a possible second message transmission on the sidelink (SL) control channel.

In some example embodiments, apparatus 30 may be controlled by memory 34 and processor 32 to determine whether to transmit an acknowledgement or non-acknowledgement to the Tx UE based on a difference between the received PD information of the Tx UE and the PD information of apparatus 30. In an example embodiment, based on the determination of whether to transmit the acknowledgement or non-acknowledgement, apparatus 30 may be controlled by memory 34 and processor 32 to transmit at least one of the acknowledgement or non-acknowledgement to the Tx UE.

For instance, in one example embodiment, when the difference between the received PD information of the Tx UE and the PD information of apparatus 30 is less than and/or equal to a PD threshold, apparatus 30 may be controlled by memory 34 and processor 32 to transmit the acknowledgement to the Tx UE over a SL feedback channel. In other words, as an example, apparatus 30 may be controlled by memory 34 and processor 32 to transmit an acknowledgement if IPDrx-PDtxl<PDthreshold, where PDrx is PD over Uu interface experienced by apparatus 30, PDtx is PD experienced by the Tx UE, and the PDthreshold is a configured threshold on the PD difference between the Tx UE and apparatus 30. In an example embodiment, PDthreshold may be configured to the apparatus 30 from 5GS using, e.g., dedicated RRC signalling or broadcast signalling (e.g., system information) or from the Tx UE via SL. In the case where the PDthreshold is provided from the Tx UE, the PDthreshold may be received in the new SCI format together with the PD information of the Tx UE. According to certain example embodiments, when the difference between the received PD information of the Tx UE and the PD information of apparatus 30 is not less than and/or equal to a PD threshold, apparatus 30 may be controlled by memory 34 and processor 32 to transmit the non-acknowledgement to the Tx UE over a SL feedback channel.

In some example embodiments, apparatus 30 may be controlled by memory 34 and processor 32 to optionally receive another SL groupcast message over the SL control channel to indicate whether PD compensation is enabled or disabled. According to an example embodiment, apparatus 30 may be controlled by memory 34 and processor 32 to receive, from the Tx UE, a second SL control message in one or more reserved resources to indicate the PD compensation is enabled. In certain example embodiments, the second SL control message may include SCI to indicate that the PD compensation is enabled or to indicate whether the PD compensation is enabled or disabled. According to some example embodiments, apparatus 30 may be controlled by memory 34 and processor 32 to transmit, to the Tx UE, an indication of whether a second SL control message in the one or more reserved resources has been received by apparatus 30.

According to certain example embodiments, when a second SL control message is not received, apparatus 30 may be controlled by memory 34 and processor 32 to start using 5G timing as acquired from the network (e.g., gNB) without PD compensation after a configured number (n) of transmission time intervals (TTIs) of the reserved resources for the second SL control message. Further, in some example embodiments, when a second SL control message is not received, apparatus 30 may be controlled by memory 34 and processor 32 to transmit a non-acknowledgement over the SL feedback channel to trigger re-initiation of the procedure for determining whether to enable or disable the PD compensation.

Furthermore, it should be noted that an apparatus, according to certain example embodiments, may include means or functions for performing any of the procedures described herein.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide PD compensation enhancements that improve the accuracy of time synchronization. As a result, example embodiments are able to provide improved support for communications services including, but not limited to, URLLC and/or IIoT applications. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
    at least one processor; and
    at least one memory comprising computer program code,
    the at least one memory and computer program code configured, with the at least one processor, to cause the apparatus at least to:
        initiate a procedure to determine whether to enable or disable propagation delay (PD) compensation for determining 5G system (5GS) timing within a sidelink (SL) group of user equipment, wherein the apparatus is configured with SL groupcast configuration;
        transmit PD information of the apparatus as a SL groupcast message over a SL control channel to at least one of the group of user equipment;
        receive at least one of acknowledgement or non-acknowledgement from one or more of the group of user equipment;

determine whether to enable or disable the PD compensation based on the received acknowledgement or non-acknowledgement from the group of user equipment; and transmit another SL groupcast message over the SL control channel to inform the at least one of the group of user equipment of the determination of whether to enable or disable the PD compensation.

2. The apparatus according to claim 1, wherein, to transmit the another SL groupcast message, the at least one memory and computer program code are configured, with the at least one processor, to cause the apparatus at least to:

transmit a second SL control message in one or more reserved resources when it is determined to enable the PD compensation.

3. The apparatus according to claim 1, wherein, to transmit the another groupcast message, the at least one memory and computer program code are configured, with the at least one processor, to cause the apparatus at least to:

transmit a second control message in one or more reserved resources to inform the at least one of the group of user equipment whether PD compensation is enabled or disabled; and receive, from the at least one of the group of user equipment, an indication of whether the second SL control message in the one or more reserved resources has been received.

4. The apparatus according to claim 2, wherein the second SL control message comprises sidelink control information (SCI) to indicate that the PD compensation is enabled or to indicate whether the PD compensation is enabled or disabled.

5. The apparatus according to claim 1, wherein the PD information is transmitted in sidelink control information (SCI), wherein the SL control information further comprises at least one of: an entire destination layer 2 (L2) identifier of SL groupcast communication or an indication of reserved resources for a second SL control message on the SL control channel.

6. The apparatus according to claim 1, wherein the SL groupcast configuration comprises at least one of:
SL groupcast destination layer 2 (L2) identifier (ID);
group size for the group of user equipment; or
member identifier of the user equipment in the group of user equipment.

7. The apparatus according to claim 1, wherein the at least one memory and computer program code are configured, with the at least one processor, to cause the apparatus at least to:

determine whether to initiate the procedure to determine whether to enable or disable the PD compensation based on whether there is a remote user equipment outside of a SL groupcast range according to information provided from an application layer or based on knowledge learned from other SL communication services.

8. The apparatus according to claim 1, wherein the at least one memory and computer program code are configured, with the at least one processor, to cause the apparatus at least to:

determine to disable the PD compensation when acknowledgement is received from all of the user equipment in the group of user equipment.

9. The apparatus according to claim 1, wherein the at least one memory and computer program code are configured, with the at least one processor, to cause the apparatus at least to:

determine to enable the PD compensation when acknowledgement is not received from all of the user equipment in the group of user equipment.

10. A method, comprising:
initiating, by a user equipment configured with sidelink (SL) groupcast configuration, a procedure to determine whether to enable or disable propagation delay (PD) compensation for determining 5G system (5GS) timing within a SL group of user equipment;

transmitting PD information of the user equipment as a SL groupcast message over a SL control channel to at least one of the group of user equipment;

receiving at least one of acknowledgement or non-acknowledgement from one or more of the group of user equipment;

determining whether to enable or disable the PD compensation based on the received acknowledgement or non-acknowledgement from the group of user equipment; and transmit another SL groupcast message over the SL control channel to inform the at least one of the group of user equipment of the determination of whether to enable or disable the PD compensation.

11. The method according to claim 10, wherein the transmitting of the another SL groupcast message comprises:

transmitting a second SL control message in one or more reserved resources when it is determined to enable the PD compensation.

12. The method according to claim 10, wherein the transmitting of the another SL groupcast message comprises:

transmitting a second SL control message in one or more reserved resources to inform the at least one of the group of user equipment whether PD compensation is enabled or disabled; and receiving, from the at least one of the group of user equipment, an indication of whether the second SL control message in the one or more reserved resources has been received.

13. The method according to claim 11, wherein the second SL control message comprises sidelink control information (SCI) to indicate that the PD compensation is enabled or to indicate whether the PD compensation is enabled or disabled.

14. The method according to claim 10, wherein the transmitting of the PD information comprises transmitting the PD information in sidelink control information (SCI), wherein the sidelink control information (SCI) further comprises at least one of: an entire destination layer 2 (L2) identifier of SL groupcast communication or an indication of reserved resources for a second SL control message on the SL control channel.

15. The method according to claim 10, wherein the SL groupcast configuration comprises at least one of:
SL groupcast destination layer 2 (L2) identifier (ID);
group size for the group of user equipment; or
member identifier of the user equipment in the group of user equipment.

16. The method according to claim 10, wherein the method further comprises:

determining whether to initiate the procedure based on whether there is a remote user equipment outside of a SL groupcast range according to information provided from an application layer or based on knowledge learned from other SL communication services.

17. The method according to claim 10, wherein the determining of whether to enable or disable the PD compensation comprises:
    determining to disable the PD compensation when acknowledgement is received from all of the user equipment in the group of user equipment.

18. The method according to claim 10, wherein the determining of whether to enable or disable the PD compensation comprises:
    determining to enable the PD compensation when acknowledgement is not received from all of the user equipment in the group of user equipment.

\* \* \* \* \*